United States Patent [19]

Strand, Sr.

[11] Patent Number: 4,575,002

[45] Date of Patent: Mar. 11, 1986

[54] STEAM HEATING APPARATUS

[76] Inventor: Charles A. Strand, Sr., 21800 Morley, Dearborn, Mich. 48124

[21] Appl. No.: 602,909

[22] Filed: Apr. 23, 1984

[51] Int. Cl.⁴ .............................................. B60H 1/00
[52] U.S. Cl. .......................................... 237/5; 237/67
[58] Field of Search .................. 237/67, 5, 16, 40, 42, 237/12.8, 73

[56] References Cited

U.S. PATENT DOCUMENTS

| | | | |
|---|---|---|---|
| 842,180 | 1/1907 | Dexter | 237/67 |
| 1,144,533 | 6/1915 | Sambar | 237/67 |
| 1,870,423 | 8/1932 | Richards | 237/67 |
| 2,182,449 | 12/1939 | Parks et al. | 237/6 |
| 2,532,550 | 12/1950 | Hubbard | 237/67 |
| 2,665,847 | 1/1954 | Schaub | 237/67 |

Primary Examiner—Henry Bennett
Attorney, Agent, or Firm—Gifford, Groh, VanOphem

[57] ABSTRACT

Steam heating apparatus for heating air introduced into a building in which the heat of condensate under pressure which otherwise would be wasted is converted into flash steam and is used in auxiliary heating means to supplement the heat of the primary heating system. The heating system operates at a predetermined steam pressure unless the incoming air temperature falls below some predetermined minimum at which additional steam temperature is required. In that case, automatic temperature responsive controls increase the steam pressure to increase the steam temperature.

16 Claims, 4 Drawing Figures

STEAM HEATING APPARATUS

This invention relates to heating air with steam and more particularly to apparatus for heating air to be introduced into industrial, commercial, institutional and high-rise buildings.

With some apparatus of this type, ambient air is heated and mixed with unheated air and is delivered to the interior of buildings in relatively large volumes. Apparatus of this type usually incorporates a plurality of air passages, some of which contain steam heat exchangers to heat the air passing therethrough and some of which allow the passage of air without heating. The heating medium, such as steam, is circulated in the heat exchangers and by manipulating dampers or air gates to control the flow of air in the heat exchange passages and by-pass passages, air is mixed and delivered at a desired temperature to the interior of the building. The air gates are controlled automatically to obtain desired ratios of heated and unheated air so that the average temperature of the air introduced into the building may be selected and maintained even though the ambient temperature varies over a wide range. Such systems frequently are referred to as face and by-pass systems with face referring to the surface of the heat exchanger.

When steam is used as the medium for heating the air, the steam is maintained at some relatively uniform pressure and therefore temperature unless the air temperature drops at which point steam pressure is increased under the control of an automatic pilot control to increase the steam temperature and therefore the heat transferred to the air. Typically the steam pressure is changed by manual settings and controls. Also in such systems, a steam trap is provided at the end of the system which opens in response to condensate level to permit condensate to flow to the condensate return system. However, the condensate at the steam trap is under pressure as a consequence of which, release of the condensate to atmospheric pressure causes a portion of the condensate to flash into steam which is permitted to escape into the atmosphere or to the condensate return system with a waste in efficiency.

It is an object of the present invention to provide steam heating apparatus in which flash steam is utilized in an auxiliary heating means to increase the efficiency of the system.

It is another object of the invention to provide steam heating apparatus for air in which steam pressure and therefore temperature is automatically regulated when the incoming air drops below come predetermined minimum.

The invention contemplates steam heating apparatus having an air passage with steam heating means disposed within the passage in heat transfer relationship, a source of steam delivering steam to the steam heating means and a condensate circuit, and a flash steam condensor between the heating means and the condensate circuit for converting hot condensate under pressure to flash steam for delivery to an auxiliary heat means positioned downstream of the air passage in heat transfer relationship to the air passing therethrough to supplement the heat delivered by the steam heating means.

A preferred embodiment of the invention is disclosed in the drawings in which.

Figure 3:
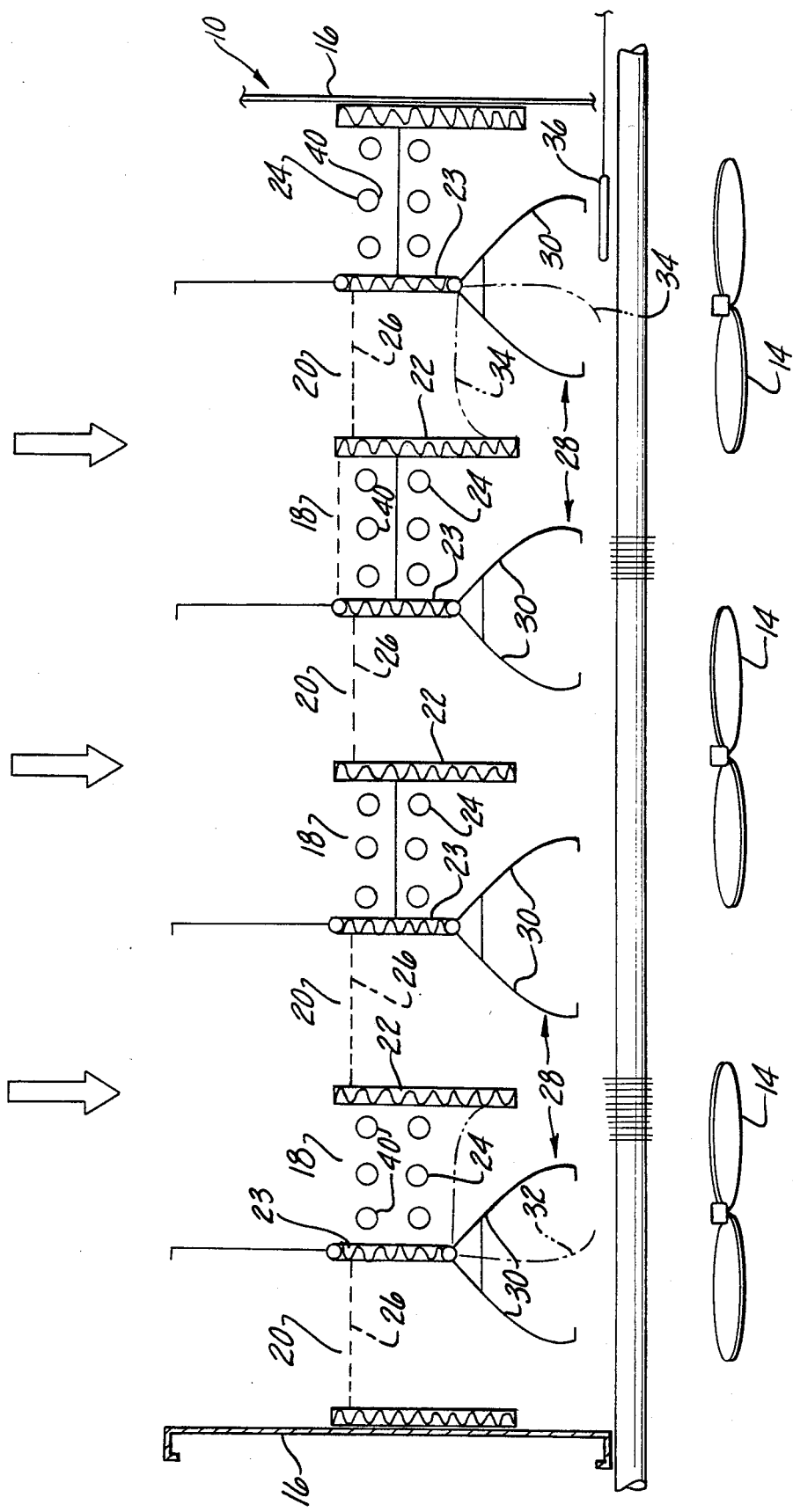
FIG. 3 is a top view of a portion of the heating apparatus shown in FIG. 1.

The heating apparatus embodying the invention is designated generally at 10 and includes a housing 12 through which air is directed by means of blowers 14 at the discharge side of the housing. As seen in FIG. 3, the housing 12 includes a pair of insulated vertical end walls 16 and the space between the end walls is divided into a plurality of alternate passages 18 and alternate passages 20 by insulated vertical walls or partitions 22 and 23. The passages 18 are provided with steam heat exchange means 24 and the passages 20 are provided with perforated plates 26 so that the passages 18 and 20 offer substantial equal resistance to the passage of air.

The outlet ends of the passages 18 and 20 are controlled by air gate assemblies 28 each of which includes a pair of air gates 30. Each pair of gates forming the assemblies 28 are supported for hinging movement about vertical hinge shafts or axes associated with the partitions 22 separating each pair of heat exchange and by-pass passages 18 and 20. The gates 30 are movable as a unit in opposite directions from the intermediate position which is illustrated in full line in FIG. 3 and in which position air passes equally through the heated and unheated passages 18 and 20. Upon swinging movement of the air gate assemblies 28, in a counter-clockwise direction as illustrated in broken lines at 32, at the left end of the structure in FIG. 3, all of the heated passages will be closed to the flow of air and all air passing through the housing 12 passes through the by-pass passages and therefore is unheated. Upon swinging movement of the air gate assemblies 28, in an opposite direction, that is counter-clockwise, to the broken line position illustrated in the drawings at 34 at the right end of the assembly in FIG. 3, the by-pass passages are completely closed and all of the air passing through the housing 12 must pass through the heat exchange passages 18 as a result of which all air is heated by the heat exchangers 24. The gate assemblies can be manipulated by appropriate control means not shown, to move between opposite extreme position to mix heated and unheated air in desired proportions. The control means may be made responsive to a temperature sensor indicated at 36 to regulate the controls and modulate the mixture of heated and unheated air.

The steam heat exchange means 24 disposed at each of the passages 18 is made up of a plurality of tube assemblies 40 each of which is made up of an outer tube 42 and a concentric inner tube 44. The tube assemblies 40 which are illustrated as being six in number are held in parallel spaced fixed relationship to each other by a plurality of uniformly spaced fins 46 which serve to increase the heat transfer area as well as to hold the tube assemblies relative to each other.

The lower ends of the tube assemblies 40 are attached to a header assembly 48 in the form of an elongated housing having a pair of parallel adjacent passages, the lower one of which forms a steam delivery header or passage 50 and the upper one of which forms a condensate return passage 52. The lower ends of each of the inner tubes 44 communicates with the steam delivery passage 50 and the lower ends of the outer tubes 42 communicate with the condensate return passage 52.

Figure 4:
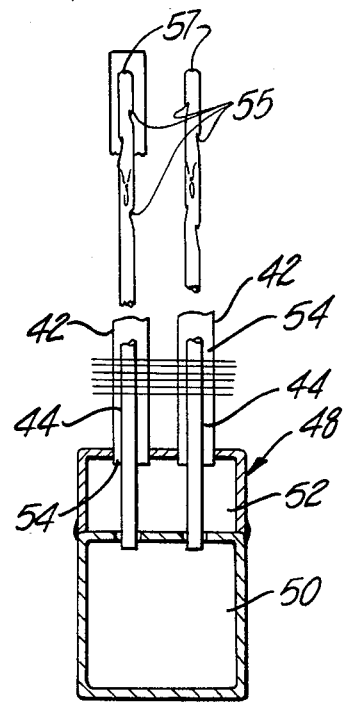
FIG. 4 is a cross-sectional view taken on line 4—4 in FIG. 1.

From the steam header 50, steam passes upwardly in the inner tubes 44 and escapes through a plurality of uniformly spaced and staggered orifices 55 (FIG. 4) into the annular passages 54. The upper ends of the inner tubes 44 are closed except for a small orifice 57 in each tube 44 which prevents the accumulation of steam. The upper ends of the outer tubes 42 are closed so that the steam or condensate must flow downwardly through the annular passage 54 formed between the tubes 42 and 44. The lower ends of the annular passages 54 communicate with the condensate return passage or header 52 by which condensate is returned to the outlet conduit 56 and to the inlet end 58 of the steam trap 60.

Figure 1:
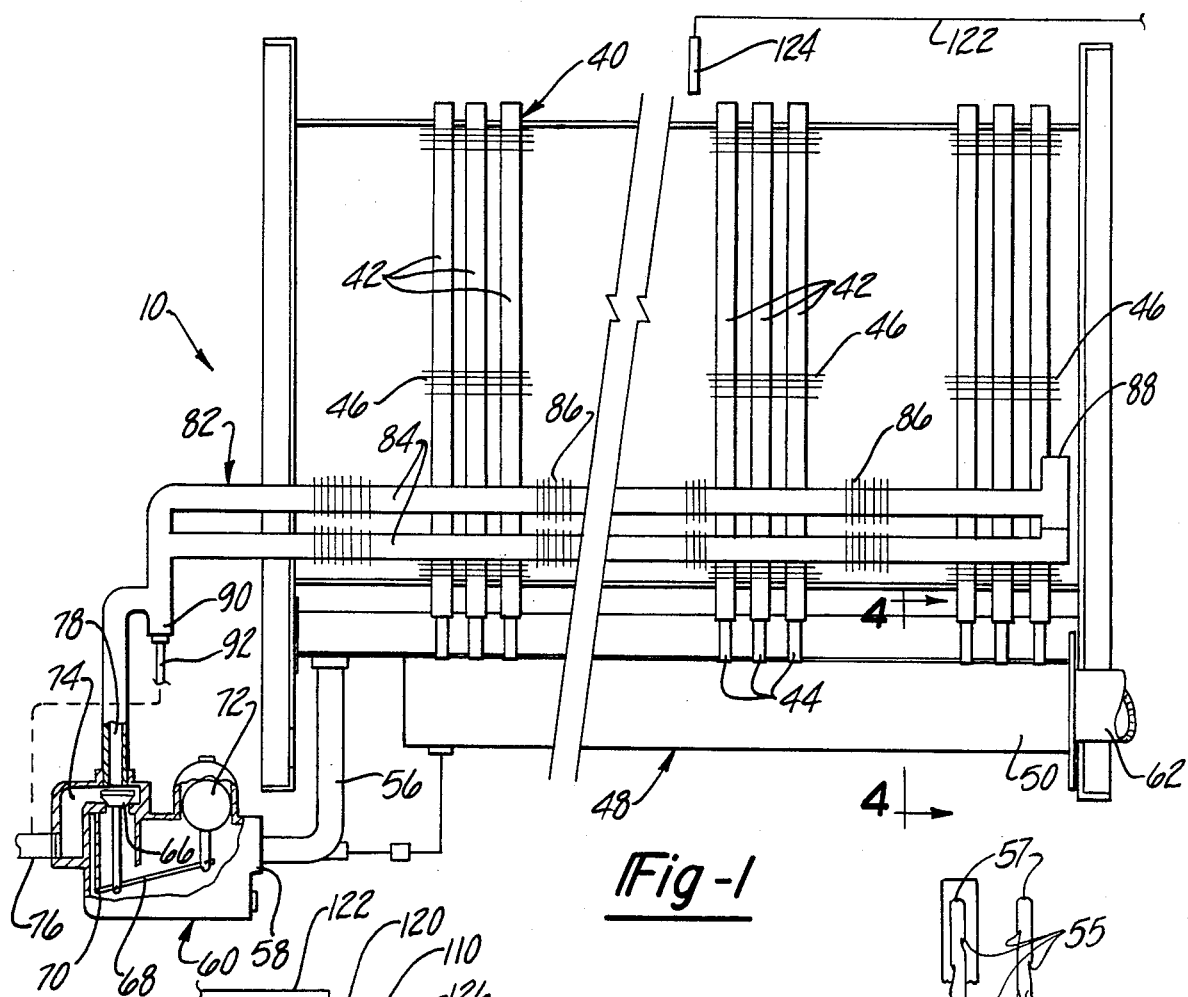
FIG. 1 is a diagrammatic plan view with portions shown in cross-section of steam heating apparatus embodying the invention.
Figure 2:
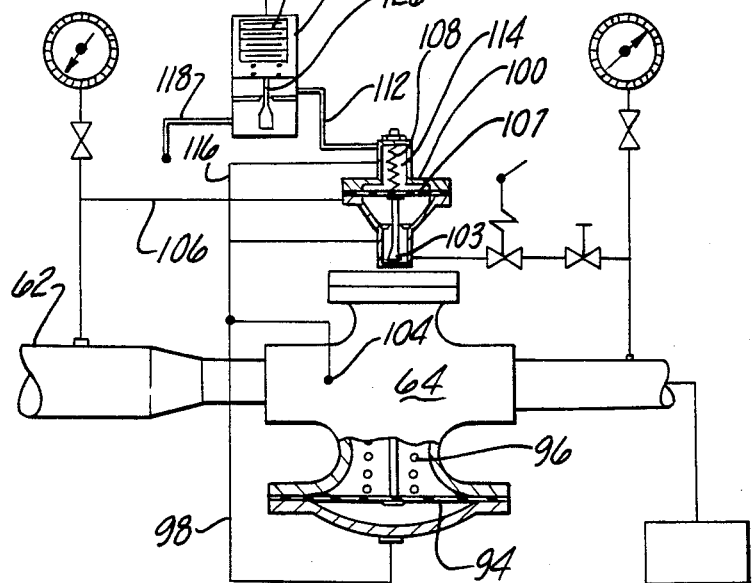
FIG. 2 is a diagrammatic view with parts in cross-section depicting the steam delivery and control system employed in the heating apparatus.

As seen in FIGS. 1 and 2, the steam delivery header 50 is connected to steam delivery conduit 62 connected through a pressure regulator 64 with a source of pressure designated at 65. Such a source of pressure 65 can be a central steam supply of the facility with which the steam heating system 10 is used. Typically the pressure of such a source is to the order of 100 to 150 psi and with the present heating system 10, the pressure regulator 64 acts to reduce the pressure to 2 psi. The pressure usually is maintained at 2 psi, but if the ambient air temperature falls below some predetermined minimum the steam pressure and therefore the steam temperature is automatically increased in response to a control system to be discussed later.

The steam trap 60 receives hot condensate from the condensate return header 52 by way of the conduit 56. The steam trap 60 is under the control of a valve arrangement 66 which includes a lever 68 pivoted to a fixed wall at 70. The opposite end of the lever 68 is provided with a float 72 which moves the lever 68 in a counter-clockwise direction as the condensate level increases. Such movement of the lever 68 opens the valve 66 which allows the condensate which is under pressure to escape to the chamber 74. The pressure of the liquid condensate is relieved as it passes through the outlet at the valve 66 and the condensate passes to condensate return pipe 76.

The steam trap 60 as described thus far is of substantially conventional construction. Unlike conventional steam traps, however, the steam trap 60 communicates with a flash steam condensor which includes a large diameter pipe 78 and connecting auxiliary heat means 82. Condensate released through the valve 66 is under pressure and when it is released to atmospheric pressure, the heat content instantly drops to that at atmospheric pressure and the surplus heat acts to reevaporate or flash a portion of the condensate to steam in pipe 78 and connecting pipes or . tubes 84. For example, hot condensate at 20 psi has a heat content of approximately 228 Btu's per pound. At atmospheric pressure, the heat content is 180 Btu's per pound. The difference of 48 Btu's per pound of condensate is available when the condensate is flashed to steam.

The flash steam formed is directed upwardly through pipe 78 and into the auxiliary heat means 82 in the form of one or more substantially horizontally arranged tubes 84. The tubes 84 have exterior fins 86 uniformly spaced for the entire length of the tubes 84 to increase the heat transfer surfaces. The tubes 84 extend at a slight incline, and the ends of the tubes 84 remote from the flash steam condensor 78 are open upwardly to the atmosphere at 88.

Heat of the flash steam delivered through the auxiliary heat means 82 is transferred through the fins to the air passing through the various passages 18 and 20 to supplement the heat added to the air by the primary heat exchangers 24. As heat is transferred from the steam it condenses within the tubes 84 and returns by gravity to the left end of the tubes 84 as viewed in FIG. 1. A trap 90 is provided to receive the discharge condensate for return through a pipe 92 to the conduit 76 returning condensate to the condensate return system.

The flash steam condensor 78 used with the present steam heating apparatus makes the entire steam heating apparatus operate more efficient by converting heat which otherwise is waste and using it to supplement the heat added to the air discharged from the passages 18 of heating system 10.

When ambient air temperature is in a range of 30° to 65° F. for example, the system is intended to operate at a steam pressure of 2 psi. However, when the temperature of the ambient air entering the heating apparatus 10 drops to lower levels, for example, below 30° F., there is not sufficient steam heat to heat the incoming air even though the bypass passages 20 are completely closed and all of the entering air through the passages 18 is heated. It, therefore, becomes necessary to increase the steam pressure and consequently its temperature. This is accomplished by automatic pilot control of the variable pressure regulator 64.

By operating in a range between 2 and 30 psi the available waste heat in the return condensate is used for auxiliary heating. For example, under normal operating steam pressures of 2 psi, the heat content of the condensate is about 187 Btu's per pound of condensate. When the condensate is released from 2 psi to atmospheric pressure, the heat content instantly drops to 180 Btu's per pound. The surplus of 7 Btu's per pound flashes to steam at the flash steam generator or condensor 78 for use in the auxiliary heating means. An examination of steam tables will show that the percentage of condensate that will flash to steam at 2 psi is slightly less than one percent. However, at 30 psi, the heat content of the condensate under pressure is 243 Btu's per pound. Reduction of the condensate to atmospheric pressure makes 63 Btu's per pound of condensate available for conversion to flash steam and the usual computations will show that at this point 13 percent of the condensate flashes to steam thereby resulting in great heat savings.

Under most conditions of operation, steam directed to the heating system from the source of steam pressure is under the control of the pressure regulator valve 64 which maintains the pressure downstream of the valve at 2 psi whenever the ambient temperature is above some predetermined range, for example 30° to 60° F. If, however, the ambient air temperature drops below 30° F., the pressure regulator 64 is automatically controlled to increase the steam pressure and therefore the temperature of the steam being delivered to the heat exchange means 24. If ambient temperature exceeds 60°, there is no need for heat and the control system shuts off delivery of steam.

The main pressure regulating valve 64 has an inlet side connected to the source of pressure 65 and an outlet side connected to the steam pipes 62 and heat exchangers 24. The source 65 of plant pressure typically is in the range of 100-150 psi and this must be reduced, preferably to 2 psi. The pressure regulator valve 64 is operated by a diaphragm 94 which is urged downwardly by a spring 96 to close the valve (not shown) and is urged upwardly to open the valve by fluid pressure in the line 98 acting on the underside of diaphragm 94. The pressure fluid in the line 98 is under the control of a pilot regulator 100 which is connected by line 102 to the source of pressure 65. When the pilot valve 103 of the regulator 100 opens, steam flows through the valve 103 faster than it can escape at a bleed point 104 at the main pressure valve 64 creating an increased pressure in line 98 which acts on the bottom of the diaphragm 94 to force the main valve 64 to its open position.

The pilot regulator 100 acts to open and close the valve 103 in response to output pressure conveyed from the output side of the pressure regulator 64 and through the control line 106. This pressure acts on the underside of a diaphragm 107 which is resisted by the pre set loading of a spring 108, plus the pressure above the diaphragm as controlled by the automatic pilot 110. As the delivery pressure rises, it overcomes the force exerted by the spring 108 and causes the pilot valve 103 to modulate. This in turn allows the main valve 64 to modulate sufficiently to maintain the set delivery pressure. If the demand for pressure above 2 psi ceases, the pilot valve 100 closes allowing the main valve 64 to regulate the output at 2 psi.

The system thus far described typically relies on the loading of the spring 108 to determine the output pressure with the spring loading being manually adjusted or adjusted selectively by the use of air or electrical controls. In the present instance, however, the control system has been made responsive to changes in temperature of air incoming to the heating system. This is accomplished by an automatic pilot valve 110 which is connected by a steam line 112 to the spring regulating chamber 114 of the pilot regulator 100. A second line 116 communicates with the steam lines 98. The automatic pilot valve 110 also communicates with a condensate return line 118. The automatic pilot valve 110 includes a metal bellows 120 as well as a line 122 and a bulb 124 seen in FIG. 1, all of which form a closed liquid system. The liquid, which should be a liquid which will not freeze at usual winter temperatures, expands and contracts in response to temperature changes such that when the temperature drops below some predetermined value such as 30°, a spring loaded needle valve 126 which operates between open and closed position under control of the bellows 120, is moved towards its closed position, causing control pressure in spring chamber 108 to increase. This increases the pressure at the upper side of the diaphragm of the pilot regulator causing the valve to move toward an open position thereby increasing the pressure and temperature of steam being delivered through the main pressure regulator valve 64.

The embodiments of the invention in which an exclusive property or privilege is claimed are defined as follows:

1. Steam heating apparatus comprising: an air passage conveying moving air, steam heating means disposed in said passage and having a steam inlet and a condensate outlet, a source of steam connected to said steam inlet, a steam trap connected to said condensate outlet for converting hot condensate under pressure to flash steam and delivering the condensate to a return conduit, a flash steam condensor receiving said flash steam and including auxiliary heat means positioned downstream of said air passage in heat transfer relationship to the air passing therethrough, said auxiliary heat means being in heat transfer relationship to the air in said passages to supplement the heat delivered to the air by said steam heating means.

2. The steam heating apparatus of claim 1 wherein said steam trap releases condensate under positive pressure to said return conduit in response to the level of condensate at said steam trap, said condensor being connected to the atmospheric side of said steam trap for receiving flash steam.

3. The steam heating apparatus of claim 1 wherein said auxiliary heating means is a tubular member extending generally horizontally and transversely to said air passages.

4. The steam heating apparatus of claim 3 wherein the end of said tubular member remote from said condensate outlet is at a higher elevation for return of condensate to said condensate return circuit by gravity.

5. The steam heating apparatus of claim 4 wherein said elevated end of said tubular member is open to the atmosphere.

6. The steam heating apparatus of claim 1 wherein said auxiliary heating means is a pair of tubular members extending generally horizontally and parallel to each other in a vertical plane and transversely to said air passage.

7. The steam heating apparatus of claim 6 wherein said pair of tubes are joined at an end remote from said condensate outlet for communication with the atmosphere.

8. The steam heating apparatus of claim 1 and further comprising means to vary the pressure of steam from said source in accordance with the temperature of air entering said air passage.

9. The steam heating apparatus of claim 8 wherein said means to vary the pressure of steam includes a temperature sensing bulb communicating with an expansible bellows, said bulb and bellows containing liquid changing volume in response to temperature, said bellows being operatively connected to a steam valve and operable to increase the pressure of steam delivered to said steam heating system in response to a decrease in air temperature.

10. The steam heating apparatus of claim 8 wherein a steam pressure regulator is interposed between said source and said steam heating means for delivering steam to said heat means in a range of approximately 2 psi through 30 psi, and means varying steam pressure in an inverse proportion to the temperature of air below a predetermined minimum entering said air passage.

11. The steam heating apparatus of claim 1 wherein said steam heating means includes a plurality of tube assemblies each including a pair of coaxial tubes forming an annular passage therebetween, the inner one of said tubes communicating with the source of steam and said annular passage communicating with said condensate return circuit.

12. A steam heating apparatus comprising: a plurality of adjacent air passages, steam heating means disposed in alternate ones of said air passages, a source of steam connected to deliver steam to said steam heating means, a condensate return circuit connected to said steam heating means for receiving condensate therefrom, a flash steam condensor, a steam trap disposed in said condensate return circuit for reducing the hot condensate pressure to atmospheric and producing flash steam, and auxiliary heat means formed as part of said condensor positioned downstream of said air passages in heat transfer relationship to the air passing therethrough, said auxiliary heat means receiving steam from said steam trap through said flash steam condensor for transfer of heat to the air in said adjacent air passages to supplement the heat delivered by said steam heating means.

13. The steam heating apparatus of claim 12 and further comprising means to vary the pressure of steam from said source in accordance with the temperature of air below a predetermined temperature entering said air passages.

14. The steam heating apparatus of claim 12 and further comprising a gate assembly associated with adjacent passages and being movable as a unit to progressively open one of said passages as the other alternate passages progessively close to regulate the proportion of air from each of said passages.

15. The steam heating apparatus of claim 14 and further comprising control means responsive to the temperature of air downstream of said gates for moving said gates.

16. The steam heating apparatus of claim 12 wherein said steam trap releases liquid condensate at a positive pressure to condensate at atmospheric pressure and wherein said condensor is disposed at the atmospheric pressure side of said steam trap for receiving said flash steam.

* * * * *